United States Patent
Lentmaier et al.

(10) Patent No.: US 8,265,202 B2
(45) Date of Patent: Sep. 11, 2012

(54) METHOD FOR ESTIMATING HIDDEN CHANNEL PARAMETERS OF A RECEIVED GNNS NAVIGATION SIGNAL

(75) Inventors: Michael Lentmaier, Dresden (DE); Bernhard Krach, Hilpoltstein (DE); Patrick Robertson, Ammerland (DE); Thanawat Thiasiriphet, Ulm (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 967 days.

(21) Appl. No.: 12/284,004

(22) Filed: Sep. 17, 2008

(65) Prior Publication Data

US 2009/0074038 A1 Mar. 19, 2009

(30) Foreign Application Priority Data

Sep. 18, 2007 (DE) .................. 10 2007 044 671

(51) Int. Cl.
*H04B 1/707* (2011.01)
(52) U.S. Cl. ........................................ 375/340; 375/148
(58) Field of Classification Search .............. 375/148, 375/341, 340, E1.002; 342/357.61, 357.77; 455/506, 504, 10
See application file for complete search history.

(56) References Cited

U.S. PATENT DOCUMENTS

| | | | |
|---|---|---|---|
| 5,963,167 A | 10/1999 | Lichten et al. | |
| 6,868,276 B2 | 3/2005 | Nissilä | |
| 7,813,438 B2 | 10/2010 | Farhang-Boroujeny et al. | |
| 2002/0080859 A1* | 6/2002 | Mottier | 375/147 |
| 2002/0116154 A1 | 8/2002 | Nowak et al. | |
| 2004/0081074 A1 | 4/2004 | Piechocki | |
| 2006/0023636 A1 | 2/2006 | Farhang-Boroujeny et al. | |
| 2006/0183430 A1* | 8/2006 | Godsill et al. | 455/67.13 |
| 2008/0154487 A1* | 6/2008 | Krach et al. | 701/200 |

OTHER PUBLICATIONS

Kris Huber and Simon Haykin "Improved Bayesian MIMO Channel Tracking for Wireless Communications:Incorporating a Dynamical Model", Array Systems Computing Inc and McMaster University, Canada, Sep. 2006, IEEE.*

Hal Huang, Changchuan Yin and Guangxin Yue, "Symbol Timing Estimation for OFDM Systems Using Particle Filtering", School of Telecommunication Engineering, Beijing University of Posts and Telecommunications, IEEE, Apr. 2007.*

L. Garin, F. van Diggelen, J. Rousseau: "Strobe and Edge Correlator Multipath Mitigation for Code" in Proceedings of the ION GPS 1996, Kansas City, Missouri, USA, 1996. (Spec, p. 3).

J. Selva Vera, "Efficient Multipath Mitigation in Navigation Systems," Universidad Politécnica de Catalunya, Dec. 9, 2003. (Spec, p. 11).

A. van Dierendonck, P. Fenton, T. Ford: "Theory and Performance of Narrow Correlator Spacing in a GPS Receiver" in Proceedings of the ION National Technical Meeting 1992, San Diego, California, USA, 1992. (Spec, p. 2).

(Continued)

*Primary Examiner* — Aristocratis Fortakis
(74) *Attorney, Agent, or Firm* — Collard & Roe, P.C.

(57) ABSTRACT

For the reduction of the multipath error of received GNSS navigation signals, a sequential Bayesian estimation is used, with a movement model underlying this estimation, which model is particularly designed for dynamic channel situations. Sequential Monte Carlo methods are used to calculate the posterior probability density functions of the signal parameters. To facilitate an efficient integration in received signal tracking loops, the invention builds on complexity reduction concepts that have previously been used in maximum likelihood (ML) estimators.

Applicable with GNSS satellite navigation receivers, e.g. GPS and Galileo.

5 Claims, 5 Drawing Sheets

OTHER PUBLICATIONS

G. McGraw, M. Braasch: "GNSS Multipath Mitigation using Gated and High Resolution Correlator Concepts" in Proceedings of the ION National Technical Meeting 1999, San Diego, California, USA, 1999. (Spec, p. 3).

J. Jones, P. Fenton, B. Smith: "Theory and Performance of the Pulse Aperture Correlator" in NovAtel Technical Report, NovAtel Inc., Calgary, Alberta, Canada, 2004. (Spec, p. 3).

D. van Nee, J. Siereveld, P. Fenton, and B. Townsend: "The Multipath Estimating Delay Lock Loop: Approaching Theoretical Accuracy Limits" in Proceedings of the IEEE Position, Location and Navigation Symposium 1994, Las Vegas, Nevada, USA, 1994. (Spec, pp. 4, 12, 15).

L. Weill: "Achieving Theoretical Accuracy Limits for Pseudo-ranging in the Presence of Multipath" in Proceedings of the ION GPS 1995, Palm Springs, California, USA, 1995. (Spec, p. 4).

J. Selva Vera: "Complexity Reduction in the Parametric Estmation of Superimposed Signal Replicas" in Signal Processing, Elsevier Science, vol. 84, Nr. 12, Seiten 2325-2343, 2004. (Spec, pp. 4-6).

P. Fenton, J. Jones: "The Theory and Performance of NovAtel Inc's Vision Correlator" in Proceedings of the ION GNSS 2005, Long Beach, California, USA, Sep. 2005. (Spec, pp. 4, 12).

P. Closas, C. Fernandez-Prades, J. Fernandez-Rubio, A. Ramirez-Gonzalez: "Multipath Mitigation using Particle Filtering" in Proceedings of the ION GNSS 2006, Fort Worth, Texas, USA, Sep. 2006. (Spec, pp. 5, 24).

L. Garin, J. Rousseau: "Enhanced Strobe Correlator Multipath Rejection for Code & Carrier" in Proceedings of the ION GPS 1997, Sunnyvale, California, USA, 1997.

B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, Dec. 2006. (German OA) (Spec, p. 5).

P.J.G. Teunissen: "Statistical GNSS Carrier Phase Ambiguity Resolution: A Review," Statistical Processing, 2001. Proceedings of the 11$^{th}$ IEEE Signal Processing Workshop, 2001, Delft, The Netherlands, pp. 4-12, ISBN 0-7803-7011-2. (German OA).

P.B. Ober: "Integrity According to Bayes," Position Location and Navigation Symposium, IEEE 2000, San Diego, California, pp. 325-332, ISBN 0-7803-5872-4. (German OA).

A. Giremus and J.-Y. Tourneret: "Joint detection/estimation of multipath effects for the global positioning system", Proceedings of the IEEE International Conference on Acoustics, Speech and Signal Processing, 2005, vol. 4, Philadelphia, Pennsylvania, USA, Mar. 2005, pp. 17-20.

P. Closas, C. Fernández-Prades, and J. Fernández-Rubio: "Maximum likelihood estimation of position in GNSS", IEEE Signal Processing Letters, vol. 14, No. 5, May 2007, pp. 1-4.

M. Angermann, J. Kammann, P. Robertson, A. Steingass and T. Strang: "*Software Representation for Heterogeneous Location Data Sources Using Probability Density Functions*", International Symposium on Location Based Services for Cellular Users, LOCELLUS 2001, Munich, Germany, Feb. 2001, pp. 107-118.

M. Arulampalam, S. Maskell, N. Gordon, and T. Clapp, "A Tutorial on Particle Filters for Online Nonlinear/Non-Gaussian Bayesian Tracking", IEEE Transactions on Signal Processing, vol. 50, No. 2, Feb. 2002.

P.Closas, C. Fernández-Prades, and J.Fernández-Rubio:, "A Bayesian Approach to Multipath Mitigation in GNSS Receivers", IEEE Journal of Selected Topics in Signal Processing, vol. 4, pp. 695-706, 2009.

M. Lentmaier, B. Krach, and P. Robertson, "Bayesian Time Delay Estimation of GNSS Signals in Dynamic Multipath Environments", International Journal of Navigation and Observation, Mar. 17, 2008.

* cited by examiner

Fig.5
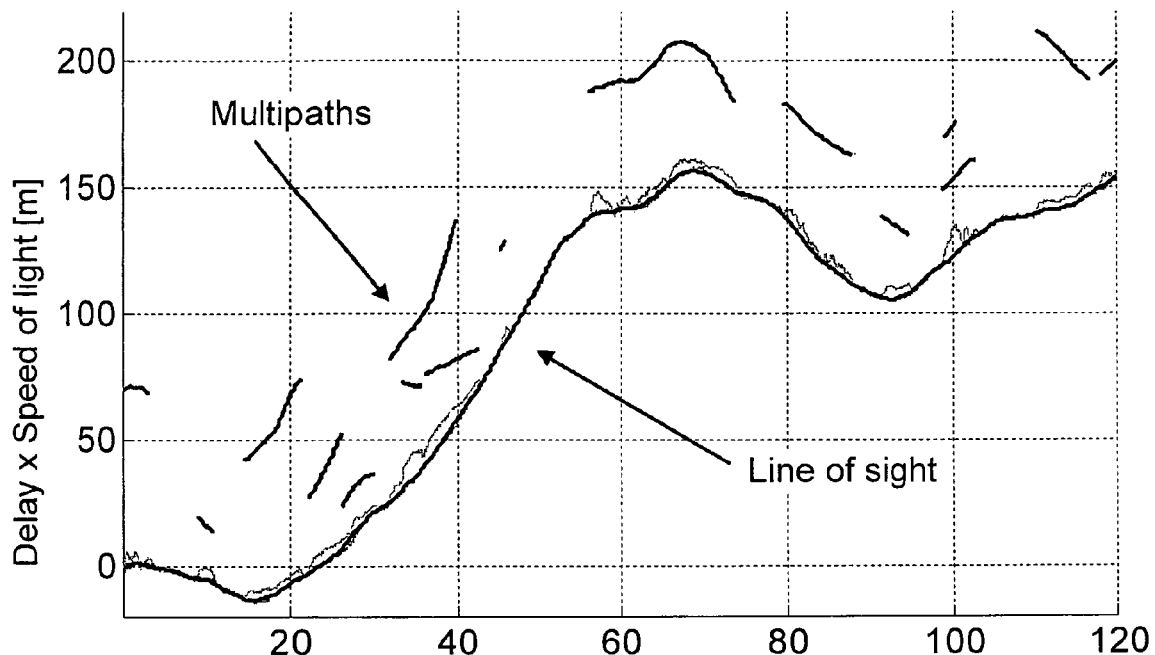
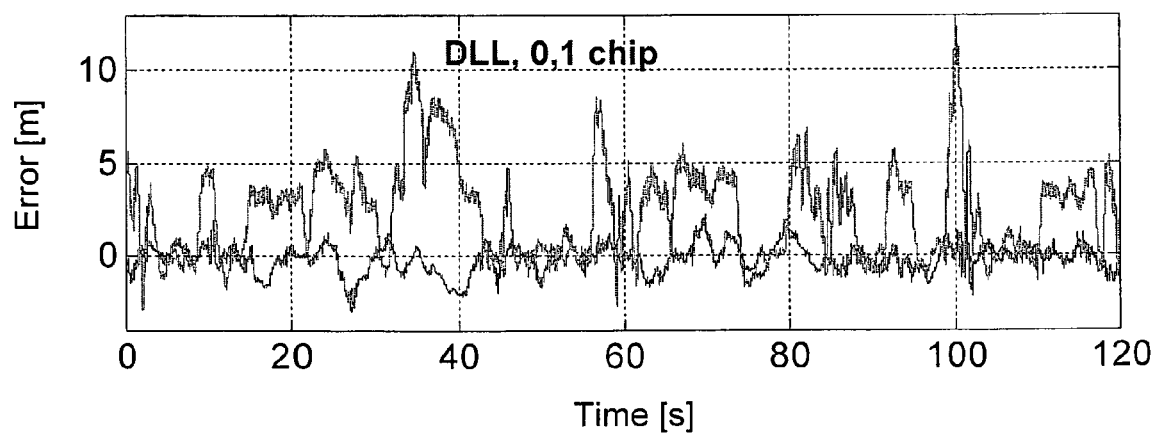
Fig.6

METHOD FOR ESTIMATING HIDDEN CHANNEL PARAMETERS OF A RECEIVED GNNS NAVIGATION SIGNAL

BACKGROUND OF THE INVENTION

The invention is directed to a method for estimating hidden channel parameters, specifically the delay, the amplitude and the phase of a GNSS navigation signal received in a dynamic multipath environment, using a sequential estimation by means of a recursive Bayesian filtering which starts from the likelihood value of the measured channel output signal and updates the value using a state transition model.

DESCRIPTION OF RELATED ART

For a continuous estimation of the propagation time and the phase of an incoming signal, which are both variable in time due to the movement of a satellite and a receiver, a navigation receiver usually uses a combination of two control loops supporting each other. The so-called phase-lock-loop (PLL) for the control of the carrier phase is used to guarantee coherence with the received signal and to allow for a representation in the baseband.

The so-called delay-lock-loop (DLL) synchronizes the received baseband signal with a locally simulated reference signal by maximizing their cross-correlation. A constant tracking of the maximum for the maintenance of the synchronization is achieved by corresponding shiftings of the reference signal from which the propagation time of the signal from the satellite to the receiver can be determined. The receiver will then calculate its own position from the propagation times of the signals from at least four satellites.

In practice, this combination of DLL and PLL proves to be a robust realization of an almost optimal propagation time estimation device when there is no multipath propagation of the signals. If, however, the received signal is formed by a superposition of individual paths, which mainly occurs due to the transmitted signal being reflected or diffracted from objects in the vicinity of the receiver, the DLL will provide an erroneous estimation, which has an immediate effect on the precision of the position result. Multipath propagations, i.e. the reception of additional signal replicas due to reflections, which introduce a deviation into the estimated value of the delay-lock-loop (DLL) of a conventional navigation receiver, thus represent a significant source of errors within GNSS systems.

Of the known signal processing methods for reducing the multipath error, most are based on more or less immediate modifications of the conventional DLL, aiming at reducing the influence of the additional paths as much as possible, i.e. to suppress this influence, as it were.

Besides the presumably most simple variant, the so-called "narrow correlator" [A. van Dierendonck, P. Fenton, T. Ford: "Theory and Performance of Narrow Correlator Spacing in a GPS Receiver" in Proceedings of the ION National Technical Meeting 1992, San Diego, Calif., USA, 1992], wide-spread use is also made, for example, of the so-called "strobe correlator" [L. Garin, F. van Diggelen, J. Rousseau: "Strobe and Edge Correlator Multipath Mitigation for Code" in Proceedings of the ION GPS 1996, Kansas City, Mo., USA, 1996], the so-called "gated correlator" [G. MacGraw, M. Brasch: "GNSS Multipath Mitigation using Gated and High Resolution Correlator Concepts" in Proceedings of the ION National Technical Meeting 1999, San Diego, Calif., USA, 1999] and the so-called "pulse-aperture correlator" [J. Jones, P. Fenton, B. Smith: "Theory and Performance of the Pulse Aperture Correlator" in NovAtel Technical Report, NovAtel Inc., Calgary, Alberta, Canada, 2004]. When receiving new forms of signals, these known methods require a particular "tuning" to reduce the impact of multipath errors as much as possible.

Another approach to the reduction of multipath errors is to include the additional paths in the formulation of the estimation problem and to solve the same by optimum methods of simplifications of such methods. Techniques for the estimation of multipath errors treat multipath errors, especially propagation time delays, amplitudes and phases of the paths, as something to be estimated from channel observations, so that their effects can be removed trivially at a later processing stage.

The estimation techniques may be differentiated into static and dynamic solutions, depending on the underlying assumption regarding the channel dynamics. Exemplary for a static multipath estimation are such estimations that belong to the family of maximum likelihood (ML) estimators which often use various effective maximization strategies through the likelihood function. Examples thereof are known from: D. van Nee, J. Siereveld, P. Fenton, and B. Townsend: "The Multipath Estimating Delay Lock Loop: Approaching Theoretical Accuracy Limits" in Proceedings of the IEEE Position, Location and Navigation Symposium 1994, Las Vegas, Nev., USA, 1994;

L. Weill: "Achieving Theoretical Accuracy Limits for Pseudo-ranging in the Presence of Multipath" in Proceedings of the ION GPS 1995, Palm Springs, Calif., USA, 1995;

J. Selva Vera: "Complexity Reduction in the Parametric Estimation of Superimposed Signal Replicas" in Signal Processing, Elsevier Science, Vol. 84, Nr. 12, Seiten 2325-2343, 2004; and P. Fenton, J. Jones: "The Theory and Performance of Novatel Inc's Vision Correlator" in Proceedings of the ION GNSS 2005, Long Beach, Calif., USA, September 2005.

The drawback of ML estimator techniques is that the parameters are presumed to be constant during the observation period. Independent estimated values are obtained for successive observation intervals whose duration has to be adapted to the dynamics of the channels. For static channels, for which no previous information is available, the ML solution is an optimum approach and works significantly better than other techniques, especially for echoes with short propagation times.

An estimator for multipath situations that is based on sequential importance sampling (SIS) methods (particle filtering) and is considered in an article by P. Closas, C. Fernandez-Prades, J. Fernandez-Rubio, A. Ramirez-Gonzalez: "Multipath Mitigation using Particle Filtering" in Proceedings of the ION GNSS 2006, Fort Worth, Tex., USA, September 2006, is advantageous in that it allows the additional use of a-priori knowledge about the channel properties. Further, the instantaneous solution and its covariance matrix are used to estimate the subsequent point in time, whereby the time-related correlation of the estimation parameters is taken into account.

While all these known estimation methods are based on the same concept, they differ in the details of the manner in which they strive to realize the solution as effectively as possible. In effect, an immediate implementation will fail due to the unrealistically high complexity. With static channels, the ML estimator is optimal and obtains clearly better results than other methods, especially when the additional paths only show slight relative delays.

One possible way to combine the knowledge about the temporal correlation of the estimation parameters with the methods for an efficient implementation of an ML estimator, proposed in the above mentioned article by J. Selva Vera, is presented in an article by B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, December 2006.

The knowledge about the parameter development may be provided, for example, by the DLL/PLL loop of a conventional receiver. The method allows to calculate the a-posteriori distribution of the estimation parameters whose maximum can be determined, for example, with the methods stated in the above mentioned article by J. Selva Vera.

All presently existing methods are suboptimal and/or not adapted to the dynamic properties of the channels. In environments that are critical with respect to multipath propagation, such as in urban canyons in cities, the navigation receivers currently known do not work reliably.

When implementing a maximum likelihood (ML) estimation method, the number of paths is presumed to be known. In practice, this number has to be estimated or assumed, however, whereby the performance of these methods can be much impaired by erroneous assumptions or erroneous estimations of this parameter.

SUMMARY OF THE INVENTION

It is an object of the present invention to provide an advantageous solution with reduced complexity, with which multipath errors can be eliminated in an optimal manner in GNSS navigation receivers not only in static channel situations, but also in dynamic channel situations, whereby the reliability of such receivers is significantly increased and, above all, the determination of geographic positions is effected much more precisely.

According to the invention, which refers to a method of the type mentioned initially, this object is solved by using previous knowledge about the statistical dependencies between two successive sets of the time-varying channel parameters, introducing therein a movement model approximated to the actual channel environment, which model corresponds to a Markov process and forms the state transition model, wherein the knowledge that reflection signals typically have a life cycle starting from their first appearance and then experience a gradual change in their delay, amplitude and phase over time until they disappear, is used for an a-posteriori prediction, and, on the basis of this movement model, by sequentially estimating the channel parameters using the recursive Bayesian filtering, wherein the number of paths is implicitly estimated as well, the result of this estimation not only being a fixed estimated value, but a-posteriori probability density functions of the estimated channel parameters.

A description as a sequential Bayesian estimation problem allows to formulate an optimum solution approach for dynamic multipath channels. For the important practical case of dynamic channel situations, the present invention provides a solution to the problem of how to improve the estimation of propagation time when information about the development of the channel parameters over time is available. The solution proposed by the invention is based on Bayesian filtering, the optimum and well known framework for mastering such problems of dynamic state estimation.

Sequential Monte Carlo (SMC) methods are used appropriately in the practical implementation for calculating the a-posteriori probability density functions (PDFS) of the signal parameters.

An efficient and advantageous implementation of the sequential Monte Carlo method for calculating the a-posteriori probability density functions is possible with the use of "sequential importance sampling" (SIS) methods ("particle filter"), especially with the use of "sampling importance resampling particle filtering" SIR-PF.

Possible applications for the method operating according to the present invention, primarily exist in modern satellite navigation receivers, especially such receivers that are to allow navigation in difficult environments with strong, time-varying multipath propagation.

Furthermore, providing reliability information in the form of a-posteriori probabilities is of interest in certain so-called safety of life (SOL) applications.

BRIEF DESCRIPTION OF THE DRAWINGS

The following is a detailed description of the invention with reference to the accompanying drawings. In the Figures:

FIG. 5 is a diagram illustrating the simulation result for a multipath situation considered, the pseudo ranges (=propagation time multiplied by speed of light) [m] being represented as a function of time [s] in the direct path (line of sight) as a continuous line and temporarily existing echoes (multipaths) being shown as short lines, and FIG. 6 illustrates, in a diagram of the distance measurement error [m] as a function of time [s] obtained by simulation, the performance of the sequential estimation process with particle filtering (lower line) according to the present invention compared with the result of a estimation using a conventional DLL with a "narrow correlator" (upper line).

DETAILED DESCRIPTION OF PREFERRED EMBODIMENTS

Figure 1:
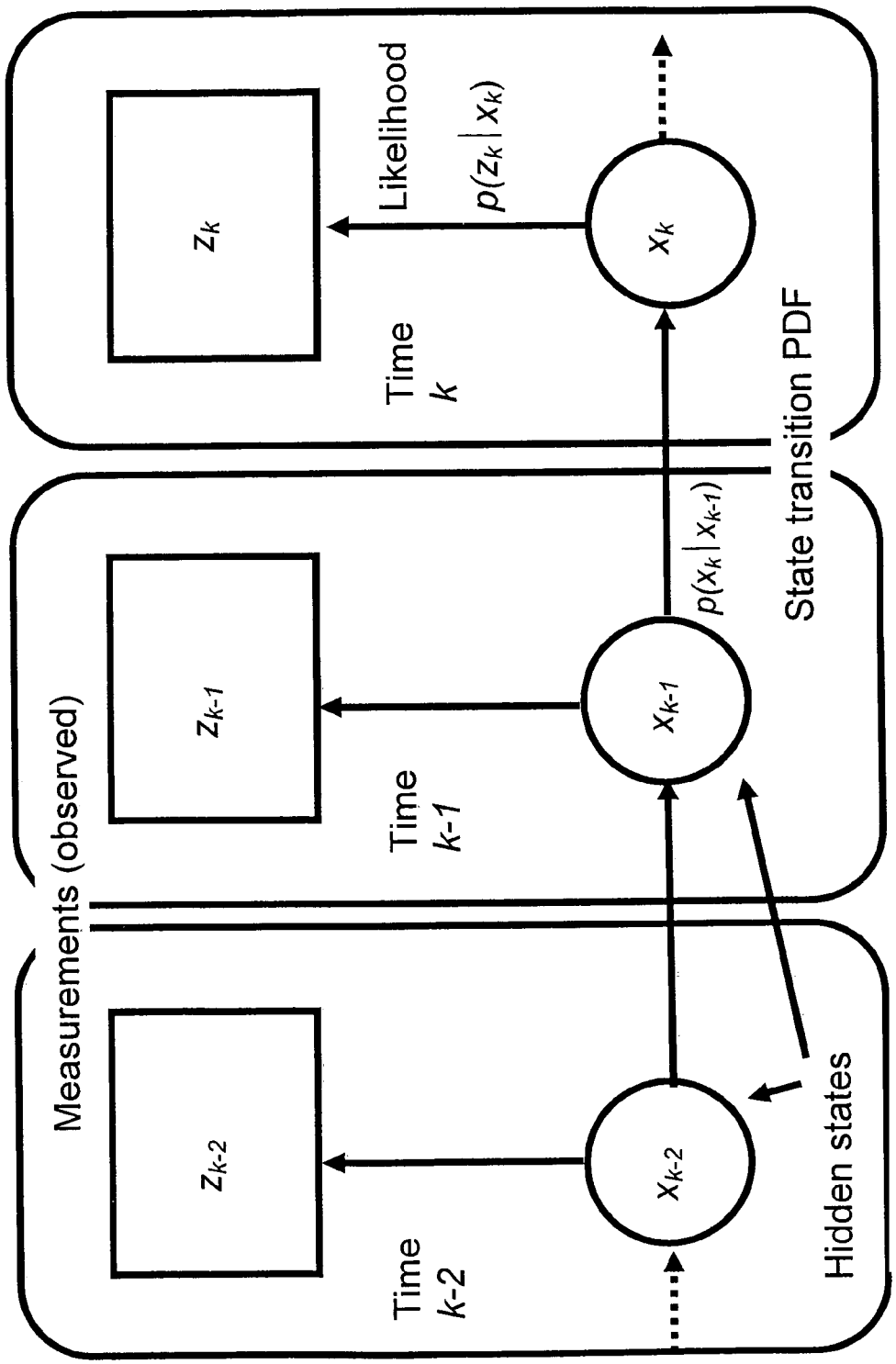
FIG. 1 is a block diagram of the hidden Markov estimation process for three times, the channel measurements being represented by the sequence $z_i$, i=1, ..., k, and the channel parameters are $x_i$, i=1, ..., k.

First, the underlying signal model will be explained.

Let it be assumed that the complex-valued, baseband-equivalent received signal equals $$z(t) = \sum_{i=1}^{N_m} e_i(t) \cdot a_i(t) \cdot c(t) * g(t - \tau_i(t) + n(t)) \quad (1)$$

where c(t) is a delta-train code sequence modulated to a pulse g(t). $N_m$ is the total number of paths allowed that reach the receiver (so as to restrict the modeling complexity), $e_i(t)$ is a binary function controlling the activity of the i-th path and $a_i(t)$ as well as $\tau_i(t)$ are their individual complex amplitudes or time delays, respectively. Additional white Gaussian noise n(t) interferes with the signal.

If blocks of L samplings at the times (m+kL) $T_s$, m=0, ..., L−1 are grouped as vectors $z_k$, k=0, ..., wherein the parameter functions $e_i(t)$, $a_i(t)$ and $\tau_i(t)$ are assumed to be constant within the corresponding period and equal to $e_{i,k}(t)$, $a_{i,k}(t)$ and $\tau_{i,k}(t)$, this can be rewritten as $$z_k = \underbrace{CG(\tau_k)E_k a_k}_{s_k} + n_k. \tag{2}$$

In the compact form of the right side of equation (2), the samplings of the delayed pulses $g(\tau_{i,k})$ are stacked as columns of the matrix $G(\tau_k)=[g(\tau_{i,k}), \ldots, g(\tau_{N_n,k})]$, where C is a matrix representing the convolution with the code and the propagation times and amplitudes are comprised in the vectors $\tau_k = [\tau_{1,k}, \ldots, \tau_{N_m,k}]$ and $a_k=[a_{1,k}, \ldots, a_{N_m,k}]$. Moreover, $E_k=\text{diag}[e_k]$ is used in short notation, where the elements of the vector $e_k = e_k = [e_{1,k}, \ldots, e_{N_m,k}]^T$, $e_{i,k} \in 0,1$ determine whether the i-th path is active or not, by either $e_{i,k}=1$, corresponding to an active path, or $e_{i,k}=0$, corresponding to a path not active at the moment. The term $s_k$ refers to the signal hypothesis and is entirely determined by the channel parameters $\tau_k$, $a_k$ and $e_k$. Using equation (2), the associated likelihood function can be written as:

$$p(z_k \mid s_k) = \frac{1}{(2\pi)^L \sigma^{2L}} \cdot \exp\left[-\frac{1}{2\sigma^2}(z_k - s_k)^H(z_k - s_k)\right]. \tag{3}$$

The likelihood function is of central importance for the algorithms discussed herein; its purpose is the quantification of the conditional probability of the received signal determined by the unknown signal, specifically the channel parameters.

A reduction of the complexity can be obtained by data compression, interpolation and elimination of amplitudes.

In the PH.D. dissertation "Efficient Multipath Mitigation in Navigation Systems" y J. Selva Vera, Universidad Politécnica de Catalunya, February 2004, a general concept for an efficient representation of the likelihood of equation (3) was presented that is applicable to may existing ML multipath error reduction methods. The basic idea of this concept is to formulate the equation (3) by a vector $z_{c,k}$ that results from an orthogonal projection of the observed signal $z_k$ to a smaller vector space, so that $z_{c,k}$ is a sufficient statistic value according to the Neymann-Fisher factorization and is thus suitable for estimating $s_k$.

In other words: the reduced signal includes the same information as the original signal itself. In practice, this concept becomes relevant, since the projection can be achieved by processing the received signal of equation (2) by means of a correlator bank and a subsequent decorrelation of the correlator output signals. A variant of this very general concept has also been referred to as a signal compression theorem for a set of special projections, which, due to the structure of the correlators used, do not require the decorrelation step.

Different from the correlation technique used in the above mentioned article by D. van Nee, J. Siereveld, P. Fenton, B. Townsend, the technique proposed in the article by P. Fenton, J. Jones, also mentioned before, for example already projects to an orthogonal and thus uncorrelated sub-space, similar to the code-adjusted correlator technique proposed in the above mentioned dissertation document. For reasons of complexity, all practically relevant embodiments of ML estimators operate in a projected space, namely after correlation. The corresponding mathematical background will be discussed farther below, including the interpolation of the likelihood and the elimination of complex amplitudes as further methods for a reduction of complexity.

First, data compression for the reduction of complexity will be discussed. As explained above, the large vector, which includes the samplings $z_k$ of the received signal, is linearly transformed to a vector $z_{c,k}$ of much smaller size. Following this solution, the likelihood of equation (2) may be written in another form as $$p(z_k \mid s_k) = \frac{1}{(2\pi)^L \sigma^{2L}} \exp\left[-\frac{z_k^H z_k}{2\sigma^2}\right]. \tag{4}$$

$$\exp\left[\frac{\Re\{z_k^H Q_c Q_c^H s_k\}}{\sigma^2} - \frac{s_k^H Q_c Q_c^H s_k}{2\sigma^2}\right]$$

$$= \frac{1}{(2\pi)^L \sigma^{2L}} \exp\left[-\frac{z_k^H z_k}{2\sigma^2}\right].$$

$$\exp\left[\frac{\Re\{z_{c,k}^H s_{c,k}\}}{\sigma^2} - \frac{s_{c,k}^H s_{c,k}}{2\sigma^2}\right]$$

with the compressed reception vector $z_{c,k}$ and the compressed signal hypothesis $s_{c,k}$:

$$z_{c,k}=Q_c^M z_k, s_{c,k}=Q_c^H s_k \tag{5}$$

and the orthonormal compression matrix $Q_c$ that has to fulfill $$Q_c Q_c^H \approx I, Q_c^H Q_c \approx I \tag{6}$$

in order to minimize the compression loss. According to the above mentioned dissertation document, the compression may be double, so that $$Q_c = Q_{cc} Q_{pc} \tag{7}$$

can be factorized to a canonic component decomposition $Q_{cc}$ and a principal component decomposition $Q_{pc}$. In the above mentioned dissertation document, two possible choices are proposed for $Q_{cc}$, namely $$Q_{cc} = \begin{cases} CG(\tau^b)R_{cc}^{-1} & \text{signal-adjusted} \\ C(\tau^b)R_{cc}^{-1} & \text{code-adjusted} \end{cases} \tag{8}$$

where the elements of the vector $\tau^b$ define the positions of the individual correlations. For a decorrelation of the correlator output signals, as mentioned above, the whitening matrix $R_{cc}$ may be obtained from a QR decomposition of $CG(\tau^b)$ or $C(\tau^b)$. Apart from operational conditions, both correlation methods indicated by equation (8) are equivalent from a conceptual point of view. As far as details regarding the compression by $Q_{pc}$, reference is made to the above mentioned dissertation document.

Hereinafter, the interpolation performed in connection with the reduction of the complexity will be discussed. In order to calculate equation (4) irrespective of the sampling grid, interpolation methods may be employed to an advantage. When using the discrete Fourier transformation (DFT), where $\Psi$ is the DFT matrix and $\Psi^{-1}$ is its inverted counterpart (IDFT), $$s_{c,k} = \underbrace{Q_c^H C\Psi^{-1} \text{diag}[\Psi g(0)]\Omega(\tau_k) E_k a_k}_{M_{s_c}=\text{const.}} \tag{9}$$

will be obtained, where $\Omega(\tau_k)$ being a matrix of stacked vectors of a Vandermonde structure.

Finally, in the context of the reduction of complexity, amplitude elimination shall also be discussed herein. In a further step, the number of parameters is reduced by optimizing the equation (4) for a given set of $\tau_k$ and $e_k$ with respect to the complex amplitudes $a_k$, which may be achieved through a solution of a closed form. By using $$S_{c,k} = M_{S_c} \Omega(\tau_k) E_k \tag{10}$$

and obtaining $S_{c,k}^+$ removing the zero columns from $S_{c,k}$, the corresponding amplitude values of the active paths are obtained:

$$\hat{a}_k^+ = (S_{c,k}^{+H} S_{c,k}^+)^{-1} S_{c,k}^{+H} z_{c,k}. \tag{11}$$

Since a potential source of loss in performance has been introduced by the elimination of the amplitudes and their correlation in time is thus practically not considered, it is proposed to optimize equation (4) by using $$\bar{z}_{c,k} = \frac{1}{Q} \cdot \sum_{l=0}^{Q-1} z_{c,k-l} \tag{12}$$

with the adjustable observation coefficient Q. When equation (4) is evaluated, $$s_{c,k} = S_{c,k} \hat{a}_k \tag{13}$$

is used, where the elements of the vector $\hat{a}_k$ that indicate an active path ($a_{k,i}$: $i \to e_{k,i}=1$) are set to the corresponding elements of $\hat{a}_k^+$. All other elements ($a_{k,i}$: $i \to e_{k,i}=0$) may be set optionally, since their influence is masked by the zero elements of $e_k$.

The maximum likelihood (ML) concept will be discussed hereinafter in the context of the underlying signal model.

The concept of ML multipath estimation has given rise to substantial research interest ever since the first solution has been proposed in the above mentioned article by D. van Nee, J. Siereveld, P. Fenton, B. Townsend. Despite different approaches in different publications, the goal is the same for all ML solutions, namely to find the signal parameters that maximize equation (3) for a given observation $z_k$:

$$\hat{s}_k = \underset{s_k}{\mathrm{argmax}} \{p(z_k \mid s_k)\}. \tag{14}$$

Therefore, the signal parameters are assumed to be constant over the observation period k. There are different maximizing strategies that characterize the different solutions principally. Although substantial advantages in the theoretical analysis are offered, the practical advantage of the actual ML concept is doubtable due to a number of serious drawbacks:

The ML estimator requires the channel to be static for the observation period, and it is not capable of making use of its correlation in time over the sequence k=1, . . . . Measured channel situations have shown a significant correlation in time.

Although of great interest in practice, the estimation of the number of reception channels often is not addressed. The decisive problem in this respect is to estimate the current number of paths correctly, so as to avoid a redundant determination, since a redundantly determined estimator tends to use the additional degrees of freedom for an adjustment of noise by introducing wrong paths. Various complex heuristics based on a selection of models are used to estimate the number of paths, by they suffer from the problem that the decision thresholds have to be adjusted dynamically. Typically, only a single hypothesis is followed which, in practice, causes the propagation of an error event.

The ML estimator only provides the most probable set of parameters for the given observation. No reliability information about the estimated values is included. As a consequence, ambiguities and multimodes of the likelihood are not preserved by the estimator.

In practice, the following has to be taken into account during an ML execution. ML estimators require the parameters estimated to remain constant during the observation period. Due to data modulation and phase changes, this period, often referred to as the coherent integration time, is limited in practice to a span 1 ms to 20 ms.

In order to obtain a sufficient noise performance with an ML estimator, it is necessary to expand its observation interval to about the equivalent adjustment time of a conventional tracing loop that usually is on the order of several hundred coherent integration periods. To eliminate these problems, the observations must become quasi coherent by supporting the ML estimator with a phase lock loop (PLL) and a data removal mechanism.

The following is an explanation of the sequential estimation used in the method of the present invention.

First, the optimum solution will be discussed.

In the preceding part of the description, the signal models of the underlying time-varying processes have been established. The problem of multipath error reduction now becomes a problem of a sequential estimation of a hidden Markov process: The unknown channel parameters are to be estimated on the basis of a building sequence of received noisy channel output signals $z_k$.

The channel process for each coverage range of a satellite navigation system may be modeled as a Markov process of the first order, if future channel parameters—with the present state of the channel being known—only depend on the present state of the channel (and not on any past states). It is further assumed that the noise influencing the sequential channel output signals is independent of the past noise values. Thus, each channel observation only depends on the present channel state. As is known, Markov processes of higher order can be transformed into such processes of the first order.

By intuition, not only the channel observation is used, to estimate the hidden channel parameters (through the likelihood function), but previous knowledge about the statistical dependencies between subsequent sets of channel parameters are used as well. It is known from channel measurements that channel parameters are time-varying, but not independently from one point in time to the next; usually an echo signal has a "life cycle" from its first appearance, followed by a more or less gradual change in its delay and phase over time, until it disappears.

After the principal assumptions have been made, the concept of the sequential Bayesian estimation may now be applied. The entire history of observations (through the time index k) may be written as $$Z_k \triangleq \{z_i, i=1, \ldots, k\}. \tag{15}$$

Similarly, the sequence of parameters of the hidden Markov process is described by:

$$x_k \triangleq \{x_i, i=1, \ldots, k\}. \tag{16}$$

Thus, $x_i$ represents the characterization of the hidden channel state including the parameters that specify the signal hypothesis $s_i$ given in equation (2). It is the objective to determine the posterior probability density function (PDF) of every possible channel characterization, wherein all channel observations are given: $p(x_k|Z_k)$ (see FIG. 1).

Once the posterior probability density function (PDF) is evaluated, one may either determine the channel configuration that maximizes the function—the so-called maximum a-posteriori (MAP) estimated value—or one may choose an expectation—equivalent to the estimated value of the minimum mean square error (MMSE). In addition, the posterior distribution itself includes the entire incertitude about the current range and is thus the optimum measure to perform a sensor data fusion in an entire position detection system.

Figure 2:
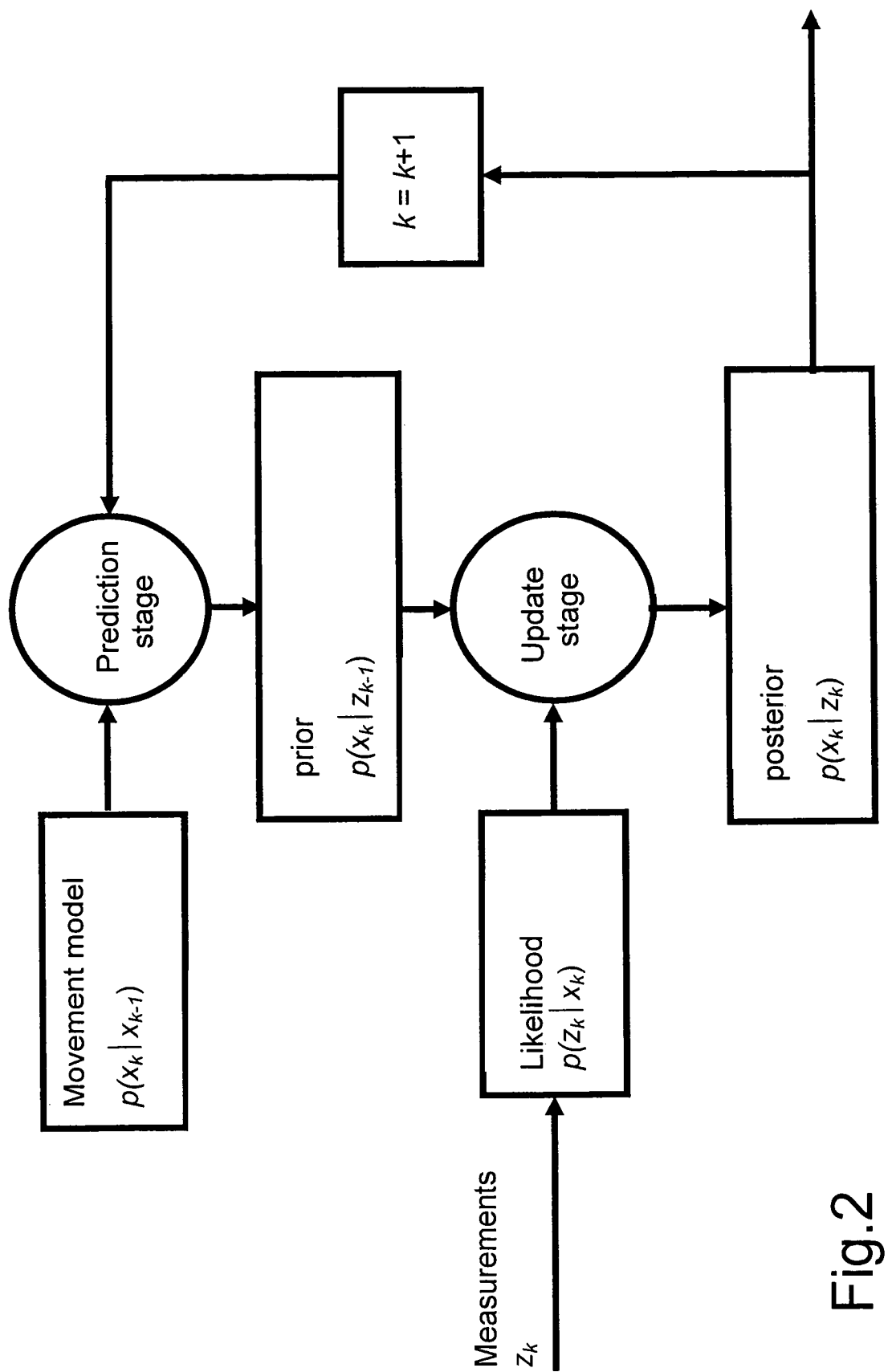
FIG. 2 is another block diagram of the recursive Bayesian estimation filter, FIG. 3 an illustration of the Markov process selected in the following description for modelling a channel with $N_m$ paths, the dotted arrows illustrated only in a small partial set of the transitions indicating the secondary condition $\Delta\tau_{i,k} \geq 0$.

It can be shown that the sequential estimation algorithm is recursive, since it uses the posterior probability density function (PDF) calculated for the time k-1 for the calculation of the posterior probability density function (PDF) for the time k (see FIG. 2). For a given posterior probability density function (PDF) $p(x_{k-1}|Z_{k-1})$ at the time k-1, the prior probability density function $p(x_k|Z_{k-1})$ is calculated in the so-called prediction step by applying the Chapman-Komogorov equation:

$$p(x_k|Z_{k-1}) = \int p(x_k|x_{k-1})p(x_{k-1}|Z_{k-1})dx_{k-1} \quad (17)$$

where $p(x_k|x_{k-1})$ is the state transition probability density function (PDF) of the Markov process. In the update step, the new posterior probability density function (PDF) for the step k is obtained by application of the Bayesian theorem on $p(x|z_k,Z_{k-1})$, the normalized product being obtained from the likelihood $p(x_k|z_k)$ and the prior probability density function (PDF):

$$p(x_k|Z_k) = p(x_k|z_k, Z_{k-1}) \quad (18)$$
$$= \frac{p(z_k|x_k, Z_{k-1})p(x_k|Z_{k-1})}{p(z_k|Z_{k-1})}$$
$$= \frac{p(z_k|x_k)p(x_k|Z_{k-1})}{p(z_k|Z_{k-1})}$$

The expression $p(z_k|x_k)=p(z_k|s_{c,k})$ follows from equation (4) and represents the probability of the measured channel output signal (often referred to as the likelihood value), determined by a certain configuration of channel parameters at the same time-interval k. The denominator of equation (18) does not depend on $x_k$ and can thus be calculated by integrating the denominator of equation (18) over the entire range of $x_k$ (normalization).

Summarized this far, the entire prediction and update process may be performed recursively in order to sequentially calculate the posterior probability density function (PDF) of equation (18) on the basis of an initial value of $p(x_0|z_0)=p(x_0)$.

The evaluation of the likelihood function $p(z_k|x_k)$ is the essential part of the update step. Likewise, maximizing this likelihood function (i.e. ML estimation) is equivalent to a maximization of $p(x_k|Z_k)$ only in the event that the prior probability density function $p(x_k|Z_{k-1})$ does not depend on $Z_{k-1}$ and if all values of $x_k$ a-priori have the same probability. Since these conditions are not met, the evaluation of $p(x_k|Z_k)$ entails all the previous steps.

The following will discuss the sequential estimation with the use of particle filters.

The optimum estimation algorithms are based on the evaluation of the integral of equation (17), which usually is a very difficult task, if not certain additional limitations are provided that are imposed upon the model and the noise process. Therefore, very often, a sub-optimum realization of a Bayesian estimator has to be selected for implementation.

According to the invention, the filter of choice is a sequential Monte Carlo (SMC) filter, especially a sampling importance resampling particle filter (SIR-PF) which may be considered a special case of a sequential importance sampling particle filter (SIS-PF). In this algorithm, the posterior density t the step k is represented as a sum and is specified by a set of $N_p$ particles:

$$p(x_k|Z_k) \approx \sum_{j=1}^{N_p} w_k^j \cdot \delta(x_k - x_k^j), \quad (19)$$

where each particle with the index j has a state $x_k^j$ and a weight $w_k^j$. The sum over all particle weights is one. With SIR-PF, the weights are calculated according to the principle of importance sampling, the so-called proposal density being chosen such that it is $p(x_k|x_{k-1}=x_{k-1}^j)$, and with a resampling at each time interval. For $N_p \to \infty$ the posterior approximation comes close to the true possibility density (PDF). Variants of the SIR-PF perform resampling only when necessary.

Hereunder, a selection of a suitable channel process made according to the present invention will be discussed.

In order to make use of the advantages of a sequential estimation to benefit the present problem of multipath error reduction/estimation, one has to be able to describe the actual channel characteristics (channel parameters) as precisely as possible, so that the same are covered by $p(x_k|x_{k-1})$. In other words: the movement model generated has to be a Markov model and all transition probabilities must be known. With the solution proposed by the present invention, the channel may be advantageously be approximated, for example, as follows:

The channel is completely characterized by a direct path (index i=1) and up to $N_n-1$ echo signal paths.

At the time k, each path described by the index i has a complex amplitude $a_{i,k}$ and a relative delay $\Delta\tau_{i,k}=\tau_{i,k}-\tau_{i,k-1}$, where the relative delays of the echo signals can only assume positive values.

The various path delays follow the stochastic process:

$$\tau_{1,k}=\tau_{1,k-1}+\alpha_{1,k-1}\cdot\Delta t+n_\tau, \quad (20)$$

$$\Delta\tau_{i,k}=\Delta\tau_{i,k-1}+\alpha_{i,k-1}\cdot\Delta t+n_\tau i>1. \quad (21)$$

The parameters $\alpha_{i,k}$ describe the speed at which the path delays change and follow their own process:

$$\alpha_{i,k} = \left(1 - \frac{1}{K}\right)\alpha_{i,k-1} + n_\alpha. \quad (22)$$

The value and the phase of the individual paths, described by the complex amplitudes $a_{i,k}$, are eliminated by maximizing the likelihood function for given values $\Delta\tau_{i,k}=\tau_{i,k}-\tau_{i,k-1}$ with respect to $a_{i,k}$. This serves to reduce the parameter space, aiming at a reduction of the complexity.

Every path may either be "on" or "off", specified by the parameter $$e_{i,k}\in\{0\text{="aus"},1\text{="ein"}\}.$$

The values $e_{i,k}$ follow a simple Markov process with two states and asymmetric transition probabilities:

$$p(e_{i,k}=0|e_{i,k-1}=1)=p_{onoff}, \quad (23)$$

$$p(e_{i,k}=1|e_{i,k-1}=0)=p_{offon}, \quad (24)$$

The stochastic movement model includes two Gaussian noise sources $n_\tau$ and $n_\alpha$ as well as the noise process for controlling the state transitions for the values $e_{i,k}$. These sources provide for the stochasticity of the movement model.

The parameter k determines how quickly the values $\Delta\tau_{i,k}$ can change. $\Delta t$ refers to the time span between the times k-1 and k.

Figure 3:
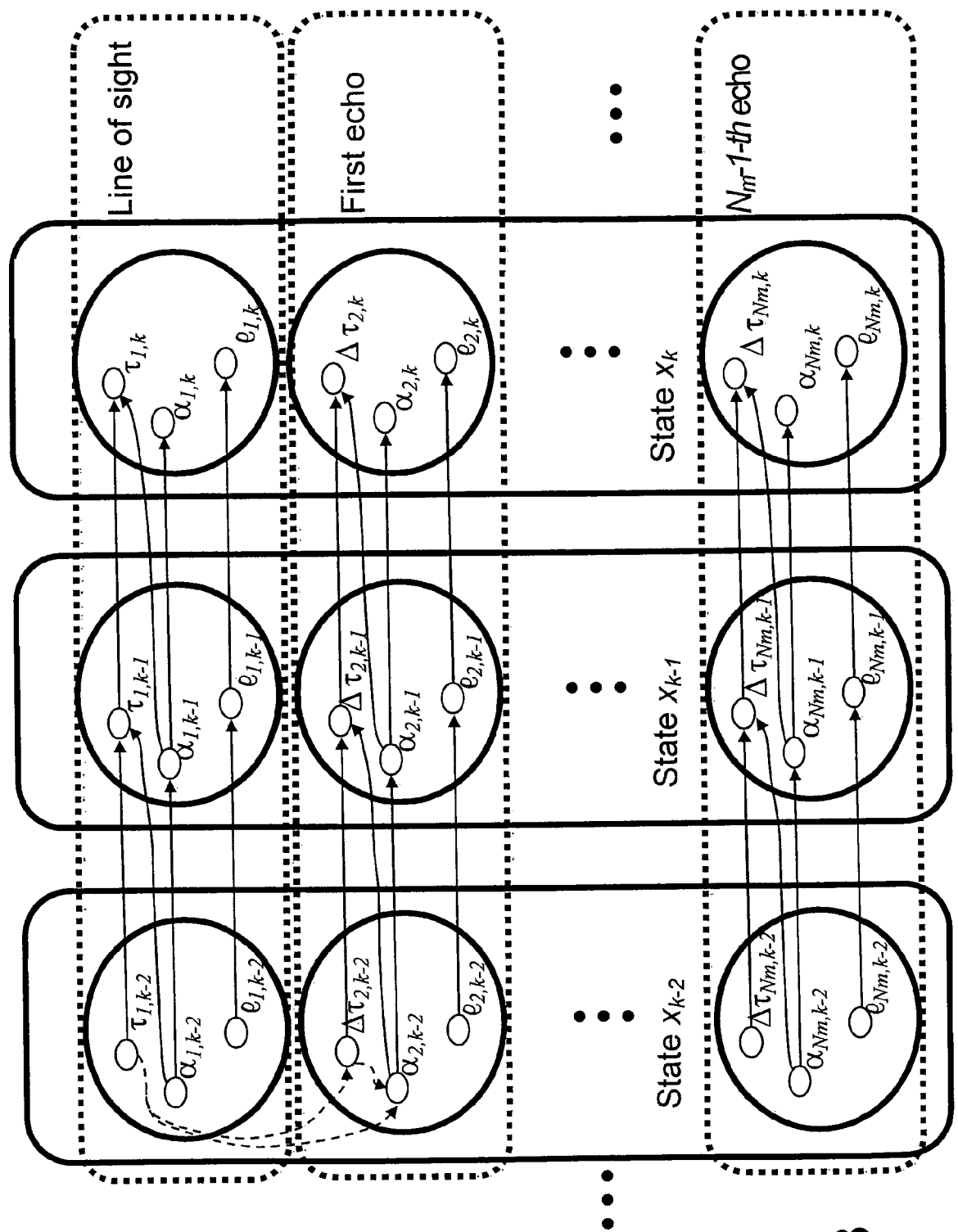

It is presumed that all model parameters, i.e. K, $\Delta t$, noise variances and the "on/off" Markov model are independent of k (see FIG. 3). It is noted that the movement model directly represents the number of paths as a time-varying parameter equal to $\Sigma_{i=1}^{N_m} e_{i,k}$. The hidden channel state parameter $x_k$ may thus be represented as:

$$[\tau_{1,k}, \Delta\tau_{2,k}, \ldots, \Delta\tau_{N_m,k}, \alpha_{1,k}, \ldots, \alpha_{N_m,k}, \ldots, e_{N_m,k}]^T \qquad (25)$$

When applied to the particle filter algorithm, obtaining the proposal density is simple. Each particle stores the above channel parameters of the movement model and the new state will be found randomly from $p(x_k|x_{k-1}^j)$, which corresponds both to obtaining of values for $n_\alpha$ and $n_\tau$ and to the concurrence of the "on"/"off" Markov model and the subsequent updating of the channel parameters for the time k according to the equations (20) to (24).

Thus, the method of the present invention is characterized by an implementation of the estimator for multipath suppression as a recursive Bayesian filter. Even the method known from the above mentioned article by P. Closas, C. Fernandez-Prades, J. Fernandez-Rubio, A. Ramirez-Gonzalez: "Multipath Mitigation using Particle Filtering" in Proceedings of the ION GNSS 2006, Fort Worth, Tex., USA, September 2006, does not follow the principle illustrated in FIG. 4. The reinitialization of the particles and the transfer of covariance matrices used there, differ from the methods provided in this application. Thus, no optimum sequential estimation is proposed, as detailed above.

The selection of the movement model—proposed by the present invention—with the speeds of change and the variable life cycle of the paths is a particular feature of the method of the present invention.

The number of paths is implicitly co-estimated in the method proposed by the present invention. At the time k, it results from the sum of the values $e_{i,k}$.

As a result, the method of the present invention yields a-posteriori probability density functions (PDF) of the estimated parameters, i.e. not only a fixed estimated value. Ambiguities are also included in the solution. This may be advantageous in the further processing within other modules of the receiver, e.g. for soft location.

As far as the adjustment of the movement model is concerned, it is important to point out that a sequential estimator only works as well as its state transition model adapts to the real ambient situation. The state model has to store all relevant hidden states in a memory and also has to model their dependencies, where the condition of the Markov process is maintained. Moreover, any storing of measurement noise that influences the likelihood function $p(z_k|x_k)$ must explicitly be included as an additional state of the model x so that the measurement noise is i. i. d. (independent and identically distributed).

The channel state model is due to channel modelling work for multipath-prone environments, such as an urban satellite navigation channel, for example. In effect, the process of setting up a channel model in order to characterize the channel for signal level simulations and reception evaluations is close to establishing a Markov process of the first order for sequential estimation. For particle filtering, the model has to meet the condition that states can be determined with relatively low computational complexity.

Adapting the model structure and the model parameters to the real channel environment is a task for current and future undertakings. It may even be possible to consider hierarchical models, in which the selection of the current model itself follows a process. In this case, a sequential estimator will automatically select the correct weighting of these models according to their ability to fit the received signal in.

Figure 4:
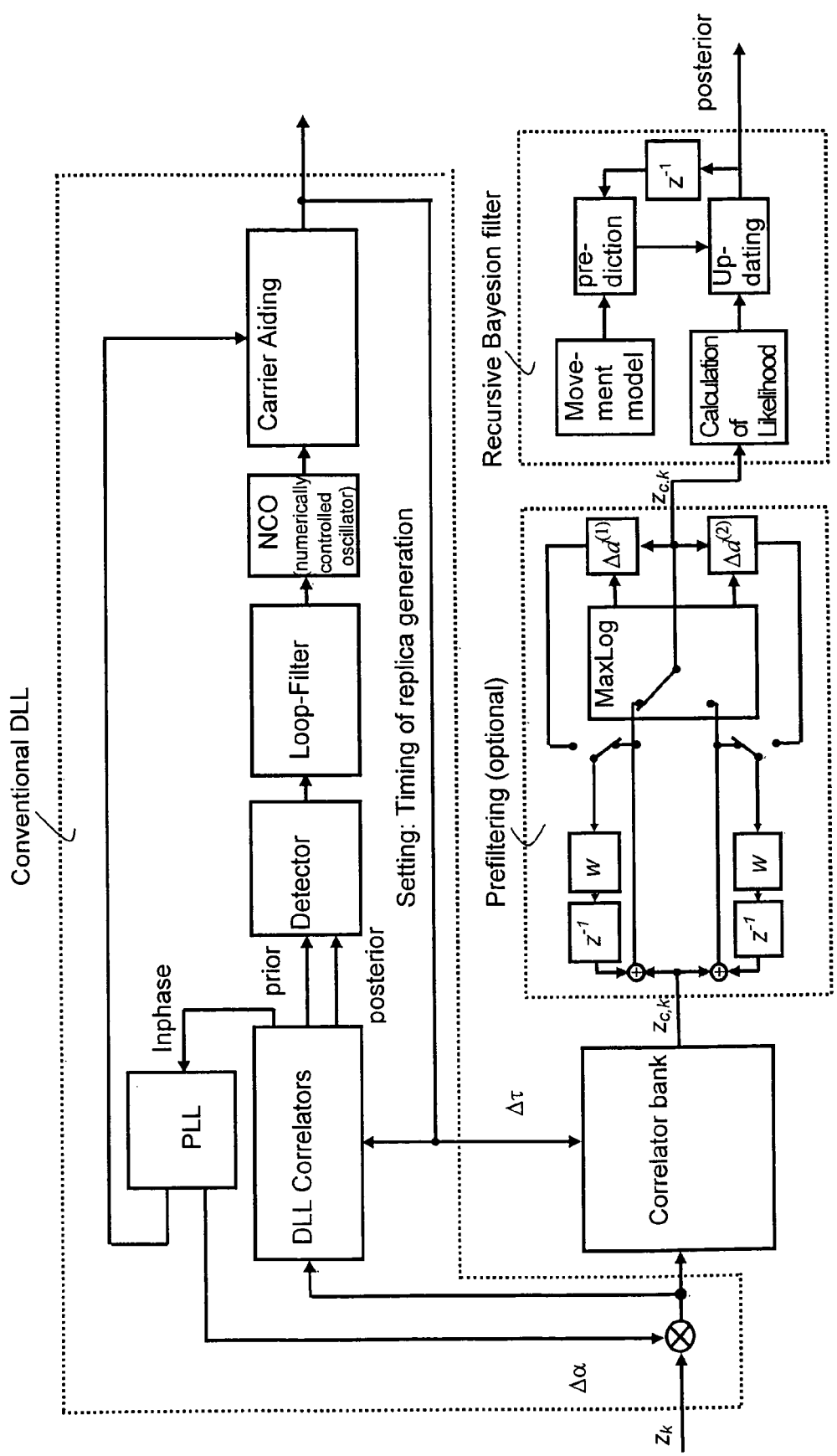
FIG. 4 is a block diagram of an embodiment of an integration of the method of the invention into a conventional GNSS navigation receiver.

The embodiment outlined in FIG. 4 as a block diagram illustrates an example of how the sequential estimator could be integrated into a conventional navigation receiver. This capitalizes on the architecture described in the above mentioned article by B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, December 2006, wherein a conventional DLL/PLL loop supports a bank of correlators whose output signals are filtered in an appropriate manner.

These filtered output signals then serve as measured values from which the likelihood values are calculated in a recursive Bayesian filter. For an efficient calculation, the known proposed methods may be used. The optional prefiltering allows to increase the time interval $\Delta t$ and to thus reduce the complexity of the Bayesian filter.

Principally, it is to be noted that the computational complexity of the Bayesian filter algorithm is critical for the integration of the inventive method into a receiver. From a theoretical point of view, it is desirable to operate the sequential Bayesian filter such that it is timed according to the coherent integration period of the receiver, and to work with a large number of particles.

From a practical point of view, however, it is desirable to reduce the sequential filter rate to the navigation rate and to minimize the number of particles. Existing ML solutions may be helpful in reaching a flexible trade-off between complexity and performance, since one may directly use strategies already developed for the expansion of the observation periods of ML estimators to reduce the rate of the algorithm for a sequential Bayesian filtering.

FIG. 5 is a diagram illustrating a simulation result for a multipath situation observed. The simulations were performed both for BPSK-modulated signals and for BOC(1,1)-modulated signals. The pseudo ranges [m], i.e. the propagation time x the speed of light, as a function of time [s] in the direct path (line of sight) are indicated by the continuous line, whereas temporary echoes (multipaths) are indicated by short lines.

The multipath channel situation with up to $N_m=3$ paths used in all simulations and illustrated in FIG. 5, has been generated according to the movement model of the present invention, the parameters K=25000, $\sigma_{n_a}=10^{-10}$, $\sigma_{n_r}=10^{-8}$ and $p_{onoff}=p_{offon}=0.0001$ being selected such that they are similar to a typical urban satellite navigation channel environment. The relative amplitudes of the echo signals were chosen to be constant and equal to 0.5, whereas the relative phases change according to $\Delta\phi_{i,k}=2\pi\Delta_{i,k}f_c$, where $f_c=1575.42$ MHz is the frequency of the L1 carrier.

FIG. 6 shows results of computer simulations by means of which the performance of the SIS-based sequential estimator is compared with that of a conventional DLL with a "narrow correlator" for a BPSK modulation. Specifically, in the diagram of FIG. 6, the performance of the sequential estimation method (lower line) with particle filtering, operating according to the invention, is shown by the distance measurement error [m] as a function of time [s] compared with the result for a conventional DLL with a "narrow correlator" (upper line". The comparison of the residual error in FIG. 6 shows that the method proposed by the invention allows for clear improvements. In the simulation, a reduction of the mean square error from 3.77 m to 0.7819 m was achieved for BPSK modulation.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A method for estimating hidden channel parameters comprising delay, amplitude and phase of a GNSS navigation signal received in a dynamic multipath environment, using a sequential estimation by means of a recursive Bayesian filtering that starts from a likelihood value of a measured channel output signal and updates the likelihood value using a state transition model, said method comprising utilizing previous knowledge about statistic dependencies of subsequent sets of time-varying channel parameters by introducing a movement model approximated to an actual channel environment, wherein said movement model corresponds to a Markov process and forms the state transition model;

conducting an a-posteriori prediction based on knowledge that a reflection signal typically has a life cycle which starts from a first appearance of the reflection signal and experiences a gradual change over time in the hidden channel parameters until the reflection signal disappears; and with the movement model as a basis, conducting an estimation of the channel parameters sequentially by means of the recursive Bayesian filter, a number of paths being included in the estimation, to obtain not only a fixed estimated value, but also a-posteriori probability density functions of the estimated channel parameters;

wherein the channel is approximated by a stochastic movement model of the following structure:

The channel is completely characterized by a direct path (index i=1) and up to $N_m-1$ echo signal paths;

At time instant k, each path described by index i has a complex amplitude $a_{i,k}$ and a relative delay $\tau_{i,k}=\tau_{i,k}-\tau_{i,k-1}$, where the relative delays of the echo signals can only have positive values The path delays follow a stochastic process:

$\tau_{l,k}=\tau_{l,k-1}+\alpha_{l,k-1}\cdot\Delta t+n_\tau$,
$\Delta\tau_{i,k}=\Delta t_{i,k-1}+\alpha_{i,k-1}\cdot\Delta t+n_\tau$, i>1;

Parameters $\alpha_{l,k}$ describe the speed at which the path delays change and are given by the following equation:

$$\alpha_{i,k} = \left(1 - \frac{1}{K}\right)\alpha_{i,k-1} + n_\alpha$$

The value and the phase of each path, described by the complex amplitudes $a_{i,k}$, are eliminated by maximizing a likelihood function for given values $\Delta\tau_{i,k}=\tau_{i,k}-\tau_{i,k-1}$ with respect to $a_{i,k}$ which reduces the parameter space and reduces complexity;

Every path may either be "on" or "off", specified by the parameter $e_{i,k}\in\{0$="off", 1="on"$\}$; and wherein the stochastic movement model includes two Gaussian noise sources $n_\tau$ and $n_\alpha$ as well as a noise process for controlling the state transitions for the values $e_{i,k}$ and parameter K determines how quickly the values $\Delta\tau_{i,k}$ can change, and $\Delta t$ refers to the time span between the time instants k-1 and k.

2. The method of claim 1, wherein the sequential Bayesian filtering uses a sequential Monte Carlo method to calculate the a-posteriori probability density functions.

3. The method of claim 1, wherein the sequential Bayesian filtering uses a sequential importance sampling (SIS) method (particle filtering), and wherein the sequential importance sampling (SIS) method is a sampling importance resampling filtering (SIR-PF).

4. The method of claim 1, wherein the sequential estimation algorithm uses the posterior probability density function calculated for the time instant k-1 to calculate the posterior probability density function for the time instant k and is thus recursive, wherein, for a given posterior probability density function at the time instant k-1, the prior probability density function is calculated in the so-called prediction step using the state transition probability density function of the Markov process, wherein, in an update step, the new posterior probability density function for the time instant k is obtained by applying a Bayesian theorem, a normalized product being obtained from the likelihood function and the prior probability density function, wherein the entire prediction and update process is thus performed recursively in order to sequentially calculate the posterior probability density function on the basis of an initial value, and wherein the evaluation of the likelihood function completes the update step.

5. The method of claim 1, wherein a reduction of complexity is achieved by at least one of data compression and interpolation and amplitude elimination, which are used in maximum likelihood (ML) estimators.

* * * * *

UNITED STATES PATENT AND TRADEMARK OFFICE
CERTIFICATE OF CORRECTION

PATENT NO. : 8,265,202 B2
APPLICATION NO. : 12/284004
DATED : September 11, 2012
INVENTOR(S) : Lentmaier et al.

Page 1 of 1

It is certified that error appears in the above-identified patent and that said Letters Patent is hereby corrected as shown below:

In particular, in Column 13, line 45 (Line 32 of Claim 1) after "delay", please change " $\tilde{\tau}_{i,k} = \tau_{i,k}$ " to correctly read: -- $\tau_{i,k} = \tau_{i,k}$ --.

Signed and Sealed this
First Day of January, 2013

David J. Kappos
*Director of the United States Patent and Trademark Office*